United States Patent
Liu et al.

(10) Patent No.: US 11,002,996 B2
(45) Date of Patent: May 11, 2021

(54) METALLIC QUANTUM WELLS

(71) Applicant: The Regents of the University of California, Oakland, CA (US)

(72) Inventors: Zhaowei Liu, San Diego, CA (US);
Yuzhe Xiao, San Diego, CA (US);
Haoliang Qian, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/156,944

(22) Filed: Oct. 10, 2018

(65) Prior Publication Data
US 2019/0155067 A1 May 23, 2019

Related U.S. Application Data

(60) Provisional application No. 62/570,541, filed on Oct. 10, 2017.

(51) Int. Cl.
*G02F 1/017* (2006.01)
*G02F 1/355* (2006.01)
(Continued)

(52) U.S. Cl.
CPC .......... *G02F 1/01725* (2013.01); *G02F 1/353* (2013.01); *G02F 1/3556* (2013.01);
(Continued)

(58) Field of Classification Search
CPC .... G02F 1/01725; G02F 1/3556; G02F 1/353; G02F 1/0157; G02F 1/3528; B82Y 20/00
See application file for complete search history.

(56) References Cited

U.S. PATENT DOCUMENTS 5,602,892 A 2/1997 Llacer
7,421,178 B2 * 9/2008 Podolskiy .............. B82Y 20/00
385/129
(Continued)

FOREIGN PATENT DOCUMENTS

WO WO-2003/092789 A2 11/2003

OTHER PUBLICATIONS

Z. Jacob, J.-Y. Kim, G. V. Naik, A. Boltasseva, E. E. Narinnanov and V. M. Shalaev, "Engineering photonic density of states using nnetannaterials", App. Phys. B 100, 215 (2010) (Year: 2010).*
(Continued)

*Primary Examiner* — Sonya McCall-Shepard
(74) *Attorney, Agent, or Firm* — Mintz Levin Cohn Ferris Glovsky and Popeo, P.C.

(57) ABSTRACT

A metallic quantum well may be formed by interposing a layer of metallic well material two layers of barrier material. Two or more metallic quantum wells may be combined to form a coupled metallic quantum well. The absorption spectrum and the emission spectrum of the coupled metallic quantum well may be tuned by at least adjusting the dimensions of the individual metallic quantum wells and/or the materials forming the metallic quantum wells. The metallic quantum well and/or the coupled metallic quantum well may exhibit sufficient nonlinearity even at a miniaturized scale. As such, the metallic quantum well and/or coupled metallic quantum well may be used for a variety of on-chip applications including, for example, as part of an on-chip pulse limiter, an on-chip super-continuum generator, and/or the like.

20 Claims, 7 Drawing Sheets

(51) Int. Cl.
*G02F 1/35* (2006.01)
*G02F 1/015* (2006.01)
*B82Y 20/00* (2011.01)

(52) U.S. Cl.
CPC ............ *B82Y 20/00* (2013.01); *G02F 1/0157* (2021.01); *G02F 1/3528* (2021.01)

(56) References Cited

U.S. PATENT DOCUMENTS

| | | | |
|---|---|---|---|
| 2002/0027971 A1 | 3/2002 | Deasy | |
| 2002/0106054 A1 | 8/2002 | Caflisch | |
| 2006/0125681 A1* | 6/2006 | Smith | H01Q 15/08 342/120 |
| 2007/0146866 A1* | 6/2007 | Wright | G02F 1/353 359/332 |
| 2009/0321712 A1* | 12/2009 | Pollard | B82Y 15/00 257/9 |
| 2015/0378243 A1* | 12/2015 | Kippelen | G02F 1/0126 359/244 |
| 2017/0299149 A1* | 10/2017 | Soljacic | G02B 5/00 |

OTHER PUBLICATIONS

Boyd et a. "The third-order nonlinear optical susceptibility of gold", Optics Communications 326 (2014) 74-79 (Year: 2014).*
Barnes, et al., Surface plasmon subwavelength optics, Nature, 2003, pp. 824-830, vol. 424.
Boyd, et al., The third-order nonlinear optical susceptibility of gold, Optics Communications, 2014, pp. 74-79, vol. 326.
Conforti, et al., Derivation of third-order nonlinear susceptibility of thin metal films as a delayed optical response, Physical Review B, 2012, 5 pages, vol. 85, No. 24.
Del'Haye, et al., Optical frequency comb generation from a monolithic microresonator, 2007, Nature, pp. 1214-1217, vol. 450.
Denalda, et al., Limits to the determination of the nonlinear refractive index by the Z-scan method, J. Opt. Soc. Am. B, 2002, pp. 289-296, vol. 19, No. 2.
Drachev, et al., Size Dependent x(3) for conduction electrons in Ag nanoparticles, Nano Letters, 2004, pp. 1535-1539, vol. 4, No. 8.
Esteban, et al., Bridging quantum and classical plasmonics with a quantum-corrected model, Nature Communications, 2012, 9 pages.
Fano, Description of states in quantum mechanics by density matrix and operator techniques, Reviews of Modern Physics, 1957, pp. 74-93, vol. 29, No. 1.
Fejer, et al., Quasi-phase-matched second harmonic generation: tuning and tolerances, IEEE Journal of Quantum Electronics, 1992, pp. 2631-2654, vol. 28, No. 11.
Hache, et al., Optical nonlinearities of small metal particles: surface-mediated resonance and quantum size effects, J. Opt. Soc. Am. B., 1986, pp. 1647-1655, vol. 3, No. 12.
Hamedi, et al., Phase-sensitive Kerr nonlinearity for closed-loop quantum systems, Physical Review A, 2015, pp. 053823-1-053823-13, vol. 91.
Hao, et al., Electromagnetic fields around silver nanoparticles and dimers, The Journal of Chemical Physics, 2004, pp. 357-366, vol. 120, No. 1.
Johnson, et al., Optical constants of the Noble Metals, Physical Review B, 1972, pp. 4370-4379, vol. 6, No. 12.
Khajavikhan, Thresholdless nanoscale coaxial lasers, Nature, 2012, 204-207, vol. 482.
Lee, et al., Giant nonlinear responses from plasmonic metasurfaces coupled to intersubband transitions, Nature, 2014, pp. 65-76, vol. 511.
Lysenko, et. al., Third-order susceptibility of gold for ultrathin layers, Optics Letters, 2016, pp. 317-320, vol. 41, No. 2.
Marinica, et al., Quantum plasmonics: Nonlinear effects in the field enhancement of a plasmonic nanoparticle dimer, Nano Letters, pp. 1333-1339, vol. 12.
Mortensen, et al., A generalized non-local optical response theory for plasmonic nanostructures, Nature Communications, 2014, 7 pages.
Moss, et al., New CMOS-compatible platforms based on silicon nitride and Hydex for nonlinear optics, Nature Photonics, 2013, pp. 597-607, vol. 7.
Pfeifle, et al., Coherent terabit communications with microresonator Kerr frequency combs, Nature Photonics, 2014, pp. 375-380, vol. 8, No. 5.
Qian, et al., Quantum electrostatic model for optical properties of nanoscale gold films, Nanophotonics, 2015, pp. 413-418.
Renger, et al., Surface-enhanced nonlinear four-wave mixing, Physical Review Letters, 2010, pp. 046803-1-046803-4, vol. 104.
Rotenberg, et al., Nonlinear absorption in Au films: Role of thermal effects, Physical Review B, 2007, pp. 155426-155426-5, vol. 75.
Savage, et al., Revealing the quantum regime in tunneling plasmonics, Nature, 2012, 4 pages, vol. 000.
Scholl, et al., Quantum plasmon resonances of individual's metallic nanoparticles, Nature, 2012, pp. 421-428, vol. 483.
Sheik-Bahae, et al., Sensitive measurement of optical nonlinearities using a single beam, IEEE Journal of Quantum Electronics, 1990, pp. 760-769, vol. 26, No. 4.
Smith, et al., Z-scan measurement of the nonlinear absorption of a thin gold film, Journal of Applied Physics, 1999, pp. 6200-6205, vol. 86, No. 11.
Sun, et al., Femtosecond-tunable measurement of electron thermalization in gold, Physical Review B, 1994, pp. 15 337-15 348, vol. 50, No. 20.
Tame, et al., Quantum plasmonics, Nature Physics, 2013, pp. 329-340, vol. 9.
Wood, et at., Quantum size effects in the optical properties of small metallic particles, Physical Review B, 1982, pp. 6255-6274, vol. 25, No. 10.
Dryzek, et al., Quantum size effect in optical spectra of thin metallic films, Physical Review Letters, 1987, pp. 721-724, vol. 58, No. 7.
Foster, et al., Broad-band optical parametric gain on a silicon photonic chip, Nature, 2006, pp. 960-963, vol. 441.
Guillet, et al., Influence of laser pulse characteristics on the hot electron contribution to the third-order nonlinear optical response of gold nanoparticles, Physical Review B, 2009, 9 pages, vol. 79.
Hache, et al., The optical Kerr Effect in small metal particles and metal colloids: The case of gold, Applied Physics A, 1988, pp. 347-357, vol. 47.
Mollenauer, et al., Experimental observation of picosecond pulse narrowing and solitons in optical fibers, Physical Review Letters, 1980, pp. 1095-1098, vol. 45, No. 13.
Paggel, et al., Quantum-Well States as Fabry-Perot Modes in a Thin-Film Electron Interferometer, Science, 1999, pp. 1709-1711, vol. 283.
Ricard, et al., Surface-mediated enhancement of optical phase conjunction in metal colloids, Optics Letters, 1985, pp. 511-513, vol. 10, No. 10.
Schmitt-Rink, et al., Linear and non-linear optical properties of semiconductor quantum wells, Advances in Physics, 1989, pp. 89-188, vol. 38, No. 2.
Sirtori, et al., Giant, triply resonant, third-order nonlinear susceptibility in chi 3 omega (3) coupled quantum wells, Phys. Rev. Lett., 1992, pp. 1010-1013, vol. 68, No. 7.
Wang, et al., Surface enhanced optical nonlinearity of a gold film, Optics Communications, 2004, pp. 425-429, vol. 229.
Wood, et al., Quantum size effects in the optical properties of small metallic particles, Physical Review B, 1982, pp. 6255-6274, vol. 25, No. 10.

* cited by examiner

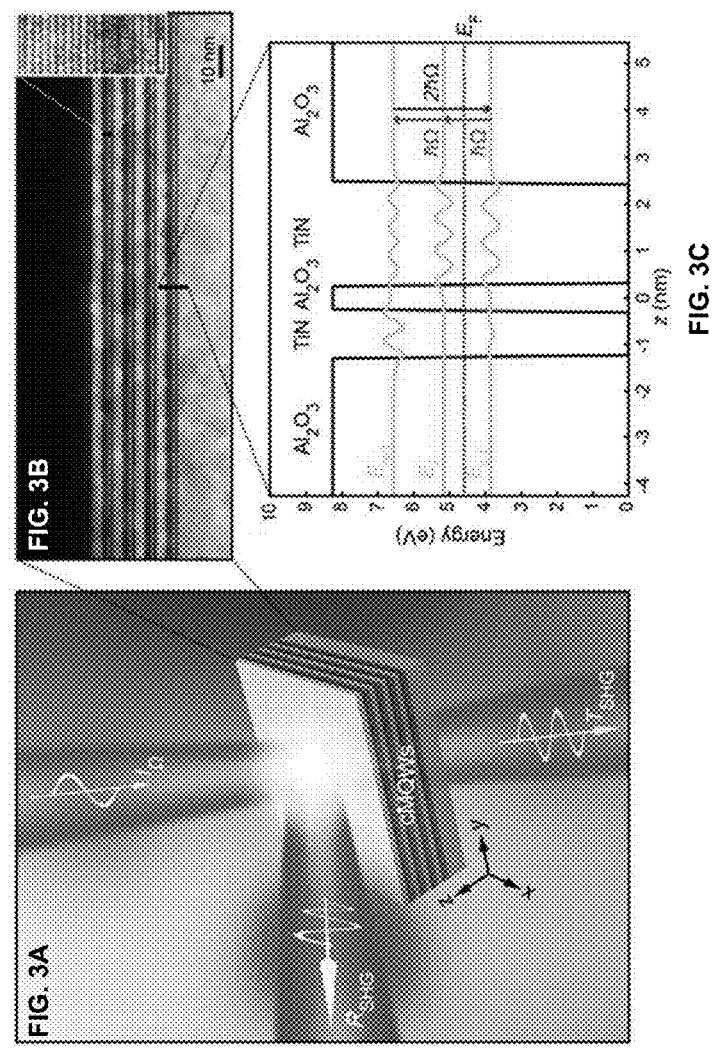

METALLIC QUANTUM WELLS

RELATED APPLICATION

This application claims priority to U.S. Provisional Patent Application No. 62/257,541 filed on Oct. 10, 2017 and entitled "METHOD FOR ON-CHIP SUPERCONTINUUM GENERATION," the disclosure of which is incorporated herein by reference in its entirety.

TECHNICAL FIELD

The subject matter disclosed herein relates generally to optics and more specifically to quantum wells for linear and nonlinear optical applications.

BACKGROUND

The interaction of light with a material may trigger a linear response and a nonlinear response from the material. The linear response may include one or more transformations (e.g., reflection, refraction, and/or the like) of the light without any change to the frequency or the wavelength of the light. By contrast, the nonlinear response may include a change to the frequency of the light. For example, a second order nonlinear response may include a doubling of the frequency of the light while a third order nonlinear response may include a tripling of the frequency of the light.

SUMMARY

Systems, methods, and articles of manufacture, including apparatuses, are provided for linear and/or nonlinear optics. In one aspect, there is provided an apparatus. The apparatus may include a first layer of metallic well material disposed between a first layer of barrier material and a second layer of barrier material. The metallic well material may generate one or more nonlinear responses when exposed to a first light having a first frequency. The one or more nonlinear responses may include a second light having a second frequency In some variations, one or more features disclosed herein including the following features may optionally be included in any feasible combination. The apparatus may further include a second layer of metallic well material disposed between the second layer of barrier material and a third layer of barrier material.

In some variations, an absorption spectrum and/or an emission spectrum of the apparatus may be tuned by at least adjusting a first thickness of the first layer of metallic well material and a second thickness of the second layer of metallic well material. The first thickness of the first layer of metallic well material may be adjusted to be equal to the second thickness of the second layer of metallic well material. The first thickness of the first layer of metallic well material may be adjusted to be different from the second thickness of the second layer of metallic well material.

In some variations, the first thickness of the first layer of metallic well material and the second thickness of the second layer of metallic well material may be equal to, less than, or greater than an exciton Bohr radius.

In some variations, an absorption spectrum and/or an emission spectrum of the apparatus may be tuned by at least selecting a first material comprising the first layer of metallic well material to be the same as or different from a second material comprising the second layer of metallic well material.

In some variations, the metallic well material may include a metal and/or a metal compound. The metallic well material may include a noble metal and/or a transition metal nitride.

In some variations, the barrier material may be associated with a wider bandgap than the metallic well material. The barrier material may be a dielectric.

In some variations, the one or more nonlinear responses may include a second order nonlinear response or a third order nonlinear response. The second frequency may be twice or three times the first frequency.

In some variations, the first light may be associated with the first frequency and a second frequency. The second frequency may be a sum of the first frequency and the second frequency.

In some variations, the apparatus may further include a metasurface that is formed by at least disposing, on top of a surface of the apparatus, one or more plasmon nanostructures. The one or more plasmon nanostructures may include one or more metallic structures. The one or more plasmon nanostructures may include an array of monocrystalline silver (Ag) cubes.

In some variations, the metallic well material may further generate one or more linear responses when exposed to the first light having the first frequency. The one or more linear may responses include a third light having the first frequency.

In another aspect, there is provided a pulse limiter. The pulse limiter may include a metallic quantum well formed by interposing a layer of metallic well material between two layers of barrier material. The metallic quantum well may generate a linear response when exposed to a first light having a first intensity that is below a threshold value. The linear response may include a reflection of the first light without attenuation of the first intensity of the first incident light beam. The metallic quantum well may generate a nonlinear response when exposed to a second light having a second intensity that exceeds the threshold value. The nonlinear response may include a reflection of a third light having a third intensity below the threshold value. The third light may be generated by at least attenuating the second intensity of the second light.

In another aspect, there is provided a super-continuum generator. The super-continuum generator may include a metallic quantum well formed by interposing a layer of metallic well material between two layers of barrier material. The metallic quantum well may generate a nonlinear response when exposed to a first light. The first light may be monochromatic. The nonlinear response may include a broadband of frequencies forming a super-continuum.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to nonlinear optics and applications thereof, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 3A depicts the generation of second order nonlinear responses by a coupled metallic quantum well, in accordance with some example embodiments;

FIG. 3B depicts the generation of second order nonlinear responses by a coupled metallic quantum well, in accordance with some example embodiments;

FIG. 3C depicts the generation of second order nonlinear responses by a coupled metallic quantum well, in accordance with some example embodiments;

When practical, similar reference numbers denote similar structures, features, or elements.

DETAILED DESCRIPTION

Figure 1:
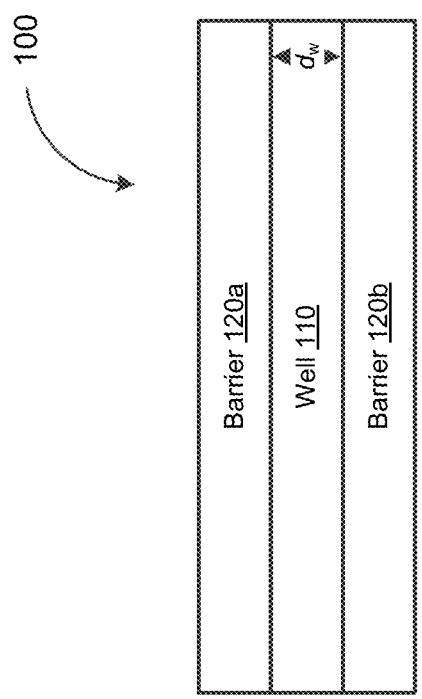
FIG. 1 depicts a cross sectional view of a metallic quantum well, in accordance with some example embodiments.

The nonlinear responses of a material to light may be exploited for a variety of applications including, for example, metrology, communications, and/or the like. A quantum well may be a type of structure used for generating nonlinearity. For instance, a quantum well may be a heterostructure that is formed by interposing a layer of well material between two layers of barrier material. Minimizing the dimensions of the well material, for example, to approximately the distance between an electron-hole pair (e.g., the exciton Bohr radius), may give rise to a quantum confinement effect in which charge carriers, such as electrons and holes, are confined within the layer of well material and forced to transition between discrete energy states. This quantum confinement effect may further trigger a Kerr effect, which alters the refractive index of the well material. Thus, when exposed to light having one frequency, the quantum well may generate a nonlinear response that includes light having a different frequency. For example, the quantum well may generate a second order nonlinear response by absorbing two photons of light having one frequency or two different frequencies and emitting a single photon of light having the summation of all the incident frequencies. Alternatively and/or additionally, the quantum well may generate a third order nonlinear response by absorbing three photons of light having one frequency or different frequencies and emitting a single photon of light with that the summation of all the incident frequencies.

However, a quantum well that is formed from conventional materials, such as semiconductors, may not exhibit sufficient nonlinearity, particularly at the miniature scale required for many on-chip applications. As such, in some example embodiments, a quantum well may be formed from one or more metallic materials in order to maximize the nonlinear responses of the quantum well. In some example embodiments, a metallic quantum well may be formed by interposing a layer of metallic well material between two layers of barrier material. The metallic quantum well may exhibit nonlinear responses including, for example, second order nonlinear responses, third order nonlinear responses, and/or the like. These nonlinear responses may be orders of magnitude larger than the nonlinear responses exhibited by a quantum well formed from conventional well materials such as semiconductors. Moreover, a metallic quantum well may generate nonlinear responses that operate at more broadband regions than the nonlinear responses exhibited by a quantum well formed from conventional well materials such as semiconductors. As such, the dimensions of the metallic quantum well may be miniaturized, for example, to the nanoscale required for on-chip integration while still providing adequate nonlinear responses for the corresponding applications.

In some example embodiments, the well material used for form a metallic quantum well may include a metal and/or a metallic compound. For example, the well material may include the noble metal such as, for example, gold (Au), silver (Ag), aluminum (Al) and/or the like. Alternatively and/or additionally, the well material may a transition metal nitride such as, for example, titanium nitride (TiN) and/or the like. The barrier material used to form the metallic quantum well may include any material having a large bandgap or energy gap in which no electron states can exist. For instance, the barrier material may be a dielectric such as, for example, aluminum oxide ($Al_2O_3$), silicon dioxide ($SiO_2$), and/or the like.

In some example embodiments, two or more metallic quantum wells may be combined to form a coupled metallic quantum well. The nonlinear responses of the coupled metallic quantum well including, for example, the absorption spectrum and/or emission spectrum of the coupled metallic quantum well, may be tuned by at least adjusting one or more physical properties of the coupled metallic quantum. For instance, the nonlinear responses of the coupled metallic quantum well may be dependent upon the selection of the metallic well material. The same metallic material or different metallic materials may be used to form the individual metallic wells within the coupled metallic quantum well. Alternatively and/or additionally, the nonlinear responses of the coupled metallic quantum well may be dependent upon the thickness of each metallic well and/or the barriers forming the coupled metallic quantum well. For example, the coupled metallic quantum well may be symmetric such that the individual metallic wells may have a same thickness. The coupled metallic quantum well may also be asymmetric, in which case the individual metallic wells may have different thicknesses.

In some example embodiments, one or more plasmon nanostructures may be disposed on a surface of a metallic quantum well and/or coupled metallic quantum well in order to further enhance the nonlinear responses of the metallic quantum well and/or the coupled metallic quantum well. For example, the surface of the metallic quantum well and/or coupled metallic quantum well may include one or more metallic nanostructures such as, for example, an array of monocrystalline silver (Ag) cubes and/or the like. The plasmon nanostructures may enhance the nonlinear responses of the metallic quantum well and/or the coupled metallic quantum well by at least confining incident light in a waveguide-like manner. In addition, the plasmon nanostructures may enhance the nonlinear responses of the metallic quantum well and/or the coupled metallic quantum well by providing additional surface plasmon resonance, which refers to the oscillation of electrons that have been elevated to the conduction band.

A metallic quantum well and/or a coupled metallic quantum well may be suitable for a variety of applications including on-chip applications that require the metallic quantum well to be miniaturized, for example, to nanoscale and/or the like. For instance, in some example embodiments, a metallic quantum well and/or a coupled metallic quantum well may be used for implementing an on-chip optical pulse limiter configured to attenuate intensity or power of an incident light to below a threshold level. The optical pulse limiter may be used to control, for example, the intensity or power of high-intensity ultra-short pulse lasers, thereby preventing inadvertent damage to various optical detection systems (e.g., human eyes, optical sensors, focal plane arrays, and/or the like). Alternatively and/or additionally, a metallic quantum well and/or a coupled metallic quantum well may be used to implement a super-continuum generator or frequency comb configured to broaden the narrow spectral band of monochromatic light beam, thereby generating a multicolored light spanning a wide and continuous spectrum. A super-continuum generator or frequency comb implemented using a metallic quantum well and/or a coupled metallic quantum well may be capable of achieving a wide optical spectrum over a significantly shorter propagation distance than conventional mechanisms such as, for example, optical fibers.

FIG. 1 depicts a cross sectional view of a metallic quantum well 100, in accordance with some example embodiments. Referring to FIG. 1, the metallic quantum well 100 may include a well 110 interposed between a first barrier 120a and a second barrier 120b. The metallic quantum well 100 may be a heterostructure. As such, the well 110 may be formed from a different material than the first barrier 120a and the second barrier 120b. In particular, the material forming the well 110 may have a narrower bandgap than the material forming the first barrier 120a and the material forming the second barrier 120b. It should be appreciated that the bandgap or energy gap of a material in which no electron states may exist may correspond to a difference between an energy of the conduction band and an energy of the valance band.

In some example embodiments, the well 110 may be formed from a metal and/or a metallic compound. For example, the well 110 may be formed from noble metal such as, for example, gold (Au), silver (Ag), aluminum (Al) and/or the like. Alternatively and/or additionally, the well 110 may be formed from a transition metal nitride such as, for example, titanium nitride (TiN) and/or the like. Meanwhile, the first barrier 120a and/or the second barrier 120b may be formed from a dielectric. For instance, the first barrier 120a and/or the second barrier 120b may be formed from a metal oxide such as, for example, aluminum oxide ($Al_2O_3$), silicon dioxide ($SiO_2$), and/or the like. However, it should be appreciated that the first barrier 120a and/or the second barrier 120b may be formed from any material having a wide bandgap or energy gap. Moreover, the first barrier 120a and the second barrier 120b may be formed from a same material or different materials.

Referring again to FIG. 1, the dimensions of the well 110 may be minimized in order to trigger a quantum confinement effect in which charge carriers populating the well 110 (e.g., electrons and holes) are confined within the well 110 and forced to transition between discrete energy states. For example, the thickness $d_w$ of the well 110 may not exceed the distance between an electron-hole pair, known as the exciton Bohr radius. The concomitant Kerr effect may further alter the refractive index of the well 100. As such, the metallic quantum well 100 may be capable of generating a nonlinear response. In particular, by having the well 110 formed from a metal and/or a metallic compound, the metallic quantum well 100 may be capable of generating a nonlinear response that is orders of magnitudes larger than a quantum well formed from conventional materials such as semiconductors.

For example, the metallic quantum well 100 may generate a second order nonlinear response by absorbing two photons of light having the same or different frequencies and emitting a single photon of light having the summation of all incident frequencies. Alternatively and/or additionally, the metallic quantum well 100 may generate a third order nonlinear response by absorbing three photons of light having one or more different frequencies and emitting a single photon of light with the summation of all incident frequencies.

The magnitude of the nonlinear response generated by the metallic quantum well 100 may be quantified by a nonlinear susceptibility $\chi$ of the metallic quantum well 100. For example, the second order nonlinear susceptibility $\chi^{(2)}$ and/or the third order nonlinear susceptibility $\chi^{(3)}$ of the metallic quantum well 100 may be determined by performing a z-scan, which may measure the complex nonlinear refractive index of the metallic quantum well 100.

For example, the third order nonlinear susceptibility $\chi^{(3)}$ of the metallic quantum well 100 may be determined based on Equation (1) below.

$$\chi^{(3)} = \frac{\text{Re}\{n_2\} + i\text{Im}\{n_2\}}{283} n(n + ik) \quad (1)$$

wherein n may denote a refractive index, k may denote an extinction coefficient, It should be appreciated that the refractive index n and the extinction coefficient k may be determined by performing reflection measurements as well as transmission measurements before applying a 2D Newton's method combined with a multilayer transmission algorithm.

When the well 110 of the metallic quantum well 100 is formed from gold (Au), for example, the third order nonlinear susceptibility $\chi^{(3)}$ of the metallic quantum well 100 may be orders of magnitude larger than that of a quantum well formed from conventional materials (e.g., semiconductors). In addition, the quantum confinement effect of minimizing the dimensions of the well 100 formed from gold (Au) may be evident in the third order nonlinearity $\chi^{(3)}$ of the metallic quantum well 100 being orders of magnitude larger than that of bulk. Table 1 below shows the third order nonlinearity $\chi^{(3)}$ exhibited by bulk gold and the well 100 formed from gold having different thicknesses $d_w$ (e.g., 3 nanometer, 15 nanometer, and 20 nanometer) when subject to light having different wavelengths $\lambda$ (e.g., 630 nanometer, 800 nanometer, and 900 nanometer) and/or pulse duration $\tau_{pulse}$ (e.g., 80 femtoseconds, 100 femtoseconds, 200 femtoseconds, and 5.8 picoseconds).

TABLE 1

| | Measurement method | $\tau_{pulse}$ | $\lambda$ (nm) | $|\chi^{(3)}|$ (m$^2$ V$^{-2}$) | $\chi^{(3)}$ (m$^2$ V$^{-2}$) |
|---|---|---|---|---|---|
| 3 nm MQW* | Nonlinear spectral broadening+ | 80 fs | 900 | 2.01 × 10$^{-15}$ | — |
| Bulk[24] | Four wave mixing | 200 fs | 800 | 2 × 10$^{-19}$ | — |
| 3 nm MQW* | z-scan | 80 fs | 900 | 2.06 × 10$^{-15}$ | (0.49 + 2.0i) × 10$^{-15}$ |
| 15 nm gold* | z-scan | 80 fs | 900 | 9.1 × 10$^{-19}$ | (−9.1 + 0.35i) × 10$^{-19}$ |
| 20 nm gold[28] | z-scan | 100 fs | 630 | 7.69 × 10$^{-19}$ | (−7.68 + 0.43i) × 10$^{-19}$ |
| Bulk TiO$_2$ | — | — | — | 2.1 × 10$^{-20}$ | — |
| Bulk Al$_2$O$_3$ | — | — | — | 3.1 × 10$^{-22}$ | — |

The magnitude of the nonlinear responses that the metallic quantum well 100 is capable of generating may be attributable to the quantum confinement of a high concentration of free electrons within the minimized dimensions of the well 110. For example, the third order nonlinear susceptibility $\chi^{(3)}$ of the metallic quantum well 100 may be proportional to Equation (2) below.

$$N(\mu_{mn})^4/(\omega_{mn}-\omega-i\gamma_{mn})^3 \quad (2)$$

wherein N may denote the density of free electrons, $\mu_{mn}=-e\langle m|\hat{r}|n\rangle$ may correspond to the dipole transition elements associated with the transition between the state n and the state m, the denominator may be related to the resonant transition, and $\gamma_{mn}$ may denote a damping term.

In accordance with Equation (2), the magnitude of the third order nonlinear susceptibility $\chi^{(3)}$ of the metallic quantum well 100 may be primarily dependent upon the density of free electrons N and the dipole transition elements $\mu_{mn}$. Due to the quantum confinement effect associated with the well 110, free electrons in the well 100 may be quantized into sub-bands while the wave functions of the free electrons in the well 110 may have an extension that is comparable to the thickness $d_w$ of the well 110. The dipole transition elements $\mu_{mn}$ associated to the transitions between these sub-bands may be on the order of e·nm, which is significantly larger than the dipole transition elements associated with conventional nonlinear materials (e.g., semiconductors). Moreover, the density of free electrons N of the metallic quantum well 100 may be on the order of 10$^{28}$ m$^{-3}$, which is also significantly greater that of conventional nonlinear materials (e.g., semiconductors). Accordingly, the metallic quantum well 100 may be capable of generating much greater nonlinear responses including, for example, third order nonlinear responses quantified by third order nonlinear susceptibility $\chi^{(3)}$, than a quantum well formed from conventional nonlinear materials.

Figure 2:
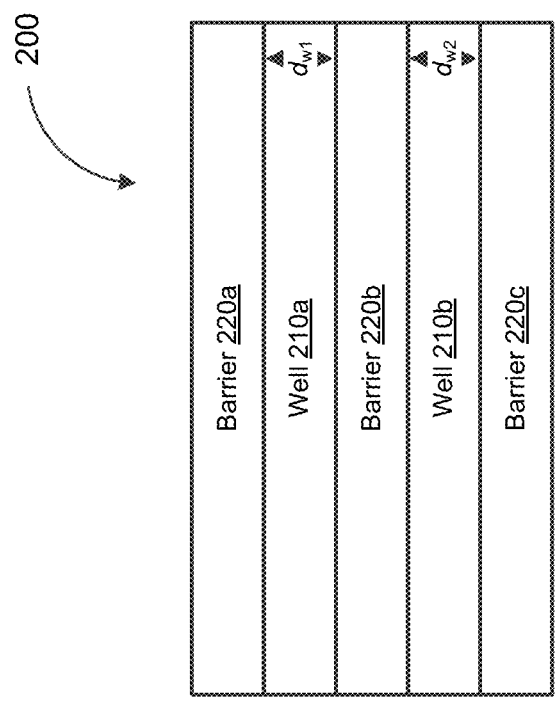
FIG. 2 depicts a cross sectional view of a coupled metallic quantum well, in accordance with some example embodiments.

FIG. 2 depicts a cross sectional view of a coupled metallic quantum well 200, in accordance with some example embodiments. According to some example embodiments, two or more metallic quantum wells such as, for example, the metallic quantum well 100, may be combined to form a coupled metallic quantum well 200. Referring to FIG. 2, the coupled metallic quantum well 200 may include a first well 210a and a second well 210b. Furthermore, the coupled metallic quantum well 200 may include a first barrier 220a, a second barrier 220b, and a third barrier 220c. The first well 210a may be interposed between the first barrier 220a and the second barrier 220b while the second well 210b may be interposed between the second barrier 220b and the third barrier 220c.

In some example embodiments, the coupled metallic quantum well 100 may be a heterostructure in which the first well 210a and the second well 210b are formed from different materials than the first barrier 220a, the second barrier 220b, and the third barrier 220c. In particular, the material forming the first well 210a and the material forming the second well 210b may have a narrower bandgap than the material forming the first barrier 220a, the material forming the second barrier 220b, and the material forming the third barrier 220c. Furthermore, according to some example embodiments, the first well 210a and the second well 210b may be formed from a metal and/or a metallic compound. For example, the first well 210a and the second well 210b may be formed from the well 110 may be formed from a noble metal (e.g., gold (Au), silver (Ag), aluminum (Al), and/or the like) and/or a transition metal nitride (e.g., titanium nitride (TiN) and/or the like). Meanwhile, the first barrier 220a, the second barrier 220b, and the third barrier 220c may be formed from any material having a wide bandgap or energy gap. For instance, the first barrier 210a, the second barrier 220b, and the third barrier 220c may be formed from a dielectric such as, for example, a metal oxide (aluminum oxide (Al$_2$O$_3$), silicon dioxide (SiO$_2$), and/or the like) and/or the like.

In some example embodiment, the nonlinear responses of the coupled metallic quantum well 200 including, for example, the absorption spectrum and/or emission spectrum of the coupled metallic quantum well 200, may be tuned by at least adjusting one or more physical properties of the coupled metallic quantum 200. For example, the nonlinear responses of the coupled metallic quantum well 200 may be dependent upon the material used to form the first well 210a and/or the second well 210b. The same metallic material or different metallic materials may be used to form the first well 210a and/or the second well 210b. As noted, the first well 210a and/or the second well 210b may be formed from any metallic material including, for example, a metal (e.g., gold (Au), silver (Ag), Aluminum (Al), and/or the like), a metal compound (e.g., titanium nitride (TiN) and/or the like), and/or the like.

Alternatively and/or additionally, the nonlinear responses of the coupled metallic quantum well 200 may be dependent upon the thickness of the first well 210a and/or the second well 210b. As noted, the coupled metallic quantum well 200 may be symmetric, in which case the first well 210a may have the same dimensions as the second well 210b. For instance, when the coupled metallic quantum well 200 is symmetric, the thickness $d_{w1}$ of the first well 210a may be equal to the thickness $d_{w2}$ of the second well 210b. By contrast, the first well 210a and the second well 210b may have different dimensions if the coupled metallic quantum well 200 is asymmetric. For example, the coupled metallic quantum well may be symmetric when the thickness $d_{w1}$ of the first well 210a is different from the thickness $d_{w2}$ of the second well 210b.

It should be appreciated that the dimensions of the first well 210a and the second well 210b including, for example, the thickness $d_{w1}$ of the first well 210a and the thickness $d_{w2}$ of the second well 210b, may be minimized in order to give rise to a quantum confinement effect. Confining charge carriers (e.g., electrons and holes) to the first well 210a and/or the second well 210b may force these charge carriers to transition between discrete energy states. This quantum confinement effect may trigger a Kerr effect that alters the refractive indices of the first well 210a and the second well 210b. In doing so, the coupled metallic quantum well 200 may generate a nonlinear response when exposed to light. The nonlinear response may include the reflection and/or the transmission of light having a different frequency and/or wavelength than the light that was incident upon the coupled metallic quantum well 200. As noted, such nonlinear responses may include second order nonlinear responses in which the frequency of the incident light is doubled and/or third order nonlinear responses in which the frequency of the incident light is tripled.

The coupled metallic quantum well 200 may exhibit nonlinear responses that are orders of magnitudes greater than the nonlinear responses exhibited by a quantum well and/or a coupled quantum well formed from conventional materials (e.g., semiconductors). For example, the magnitude of the second order nonlinear response generated by the coupled metallic quantum well 200 may be quantified as the second order nonlinear susceptibility $\chi^{(2)}$ of the coupled metallic quantum well 200.

In some example embodiments, the physical properties of the coupled metallic quantum well 200 may be tuned to create three electronic sub-bands (e.g., $E_{i-1}$, $E_i$, and $E_{i+1}$) having constant energy spacing as expressed by Equation (2) below.

$$E_i - E_{i-1} = E_{i+1} - E_i = \hbar\Omega \quad (2)$$

wherein $\hbar$ may denote the reduced Plank constant and $\Omega$ may denote the double transition frequency (e.g., the frequency of light photons absorbed by the coupled metallic quantum well 200).

By creating the three electronic sub-bands having constant energy spacing, the second order nonlinear susceptibility $\chi^{(2)}$ near the double transition frequency $\Omega$ may be expressed by Equation (3) below.

$$\chi^{(2)}(\omega) = \frac{n_{i-1} - n_i}{\hbar^2 \varepsilon_0} \frac{e^3 z_{i-1,i} z_{i,i+1} z_{i+1,i-1}}{(\omega - \Omega - i\Gamma_{i,i-1})(2\omega - 2\Omega - i\Gamma_{i+1,i-1})} \quad (2)$$

wherein $n_i$ may denote an electron density of an ith sub-band, $\varepsilon_0$ may denote a vacuum permittivity, e may denote the electron charge, $ez_{i,j}$ may denote a dipole moment of the optically active sub-bands, and $\Gamma_{i,j}$ may denote a decay rate of optically active sub-bands.

It should be appreciated that only the lowest of the three electronic sub-bands $E_{i-1}$ may be assigned below the Fermi level $E_F$ in order to increase the electron density of $(n_{i-1}-n_i)$ and maximize the second order nonlinear susceptibility $\chi^{(2)}$ of the coupled metallic quantum well 200. The product of the dipole moments $e^3 z_{i-1,i} z_{i,i+1} z_{i+1,i-1}$ may be larger when the coupled metallic quantum well 200 is asymmetric (e.g., $d_{w1} \neq d_{w2}$), thereby further maximizing the second order nonlinear susceptibility $\chi^{(2)}$ of the coupled metallic quantum well 200. In addition, the second order nonlinear susceptibility $\chi^{(2)}$ exhibited by the coupled metallic quantum well 200 may be further maximized when the frequency $\omega$ of the incident light is resonant with the double transition frequency $\Omega$.

To further illustrate, FIGS. 3A-C depict the generation of second order nonlinear responses by a coupled metallic quantum well, in accordance with some example embodiments. Referring to FIGS. 3A-C, a coupled metallic quantum well (cMQW) such as, for example, the coupled metallic quantum well 200, may be formed by interposing layers of titanium nitride (TiN) well material between layers of aluminum oxide ($Al_2O_3$) barrier material.

As shown in FIG. 3A, the coupled metallic quantum well (cMQW) may convert incident light $I_\Omega$ into the reflected second order harmonic waves $R_{SHG}$ and the transmitted second order harmonic waves $T_{SHG}$. Phase matching, a critical condition for second harmonic generation, may be satisfied due to the short propagation distance through the coupled metallic quantum well (e.g., 10 nanometers or less). Meanwhile, FIG. 3B shows a transmission electron microscope (TEM) cross section of the coupled metallic quantum well. As shown in FIG. 3B, the coupled metallic quantum well may include four metallic quantum wells in which wells formed from titanium nitride (TiN) are interposed layers of between barriers formed from aluminum oxide ($Al_2O_3$).

In some example embodiments, the coupled metallic quantum well may be asymmetric. Accordingly, FIG. 3C depicts the conduction band diagram of a portion of the coupled metallic quantum well that includes two titanium nitride (TiN) wells having different thicknesses (e.g., 1 nanometer and 2.2 nanometers) separated by an ultrathin (e.g., 0.5 nanometers) aluminum oxide ($Al_2O_3$) barrier. The electron wave functions (yellow lines) of three sub-bands $E_{i-1}$, $E_i$, and $E_{i+1}$ near the Fermi level $E_F$ (~4.6 eV) are plotted. The sub-bands $E_{i-1}$, $E_i$, and $E_{i+1}$ may be configured to provide a double resonant transition $\hbar\Omega$, thereby giving rise to the desired second order nonlinear response $2\hbar\Omega$. Moreover, the thicknesses of the titanium nitride (TiN) wells as well as the thickness of the aluminum oxide ($Al_2O_3$) barrier may determine the absorption spectrum and/or emission spectrum of the coupled metallic quantum well (cMQW).

For example, with the titanium nitride (TiN) wells at 1 nanometers and 2 nanometers thick and the aluminum oxide ($Al_2O_3$) barrier at 0.5 nanometers thick, the coupled metallic quantum well may be capable of generating second order nonlinear responses in the visible frequency range (e.g., 460 nanometer wavelength) when exposed to incident light $I_\Omega$ at a near-infrared (NIR) frequency (e.g., 920 nanometer wavelength).

In some example embodiments, the second order nonlinear responses of a metallic quantum well (e.g., the metallic quantum well 100) and/or a coupled metallic quantum well (e.g., the coupled metallic quantum well 200) may be enhanced by disposing one or more plasmon nanostructures on a surface of the metallic quantum well and/or the coupled metallic quantum well. For example, the surface of the metallic quantum well and/or coupled metallic quantum well may include one or more metallic nanostructures such as, for example, an array of monocrystalline silver (Ag) cubes and/or the like. The plasmon nanostructures may enhance the nonlinear responses of the metallic quantum well and/or the coupled metallic quantum well by at least concentrating the light emitted from the metallic quantum well and/or the couple metallic quantum well in a waveguide-like manner. In addition, the plasmon nanostructures may enhance the nonlinear responses of the metallic quantum well and/or the coupled metallic quantum well by providing additional surface plasmon resonance.

To further illustrate, FIGS. 4A-D depict the generation of second nonlinear responses by a coupled metallic quantum well having a plasmon nanostructure metasurface, in accordance with some example embodiments. Referring to FIGS. 4A-D, a coupled metallic quantum well, for example, the coupled metallic quantum well 200, may include a metasurface having one or more plasmon nanostructures such as, for example, an array of monocrystalline silver (Ag) cubes. The plasmon nanostructures forming the metasurface of the coupled metallic quantum well may enhance the nonlinear responses generated by the coupled metallic quantum well including, for example, second order nonlinear responses, third order nonlinear responses, and/or the like. However, it should be appreciated that the nonlinear responses generated by a single metallic quantum well (e.g., the metallic quantum well 100) may also be enhanced by the metallic quantum well having a metasurface formed by the disposition of one or more plasmon nanostructures atop the metallic quantum well.

A metasurface having one or more plasmon nanostructures may enhance the nonlinear responses generated by a metallic quantum well and/or a coupled metallic quantum well by at least enhancing the local electric field to overcome the limitations to diffraction imposed by the minimized dimensions of the metallic quantum well and/or the coupled metallic quantum well. The enhancement of the local electric field may be attributed to the two plasmonic resonances, one at the double transition frequency $\Omega$ and the frequency of the nonlinear response (e.g., $2\Omega$ for a second order nonlinear response). For example, the absorption of photons by the metallic quantum well and/or the coupled metallic quantum well at the double transition frequency $\Omega$ may be enhanced by the first plasmonic resonance. Meanwhile, radiative decay within the metallic quantum well and/or the coupled metallic quantum well at the second order nonlinear response frequency $2\Omega$ may be boosted by the other plasmonic resonance. The metasurface may further convert the impinging transverse electric field polarization into the desired z-direction, thereby enabling normal excitation of the incident light $I_\Omega$.

Figure 4B:
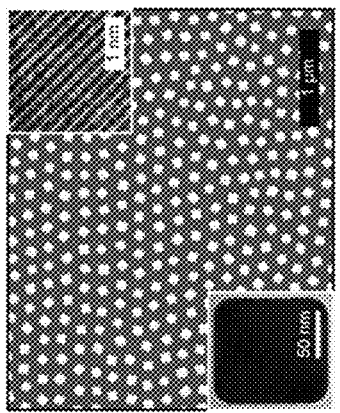
FIG. 4B depicts the generation of second order nonlinear responses by a coupled metallic quantum well having a plasmon nanostructure metasurface, in accordance with some example embodiments.
Figure 4A:
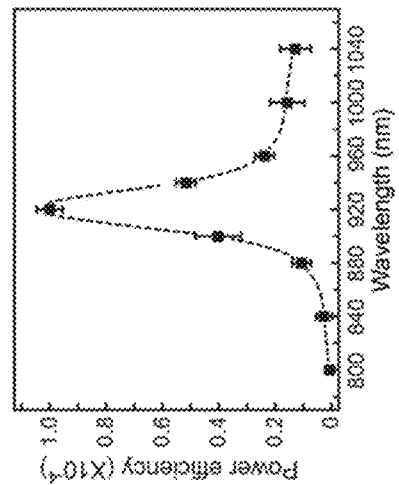
FIG. 4A depicts the generation of second order nonlinear responses by a coupled metallic quantum well having a plasmon nanostructure metasurface, in accordance with some example embodiments.

Referring to FIG. 4A, a coupled metallic quantum well may include multiple metallic quantum wells. Each metallic quantum well may include a titanium nitride (TiN) well interposed between two aluminum oxide ($Al_2O_3$) barriers. Moreover, the coupled metallic quantum well may include a metasurface formed from one or more nanostructure such as, for example, an array of monocrystalline silver (Ag) cubes and/or the like. The array of monocrystalline silver (Ag) cubes may be self-assembled before being transferred on top of the coupled metallic quantum well. FIG. 3B depicts a scanning electron microscope (SEM) image of the metasurface including the array of monocrystalline silver (Ag) cubes. These homogenously distributed monocrystalline silver (Ag) cubes may be configured to enhance the light field by plasmonic resonances. For example, the monocrystalline silver (Ag) cubes may enhance the local electric field at the longer wavelength of the incident light $I_\Omega$ by at least confining the incident light $I_\Omega$ in a waveguide-like manner. The monocrystalline silver (Ag) cubes may further enhance the electric field associated with the second order nonlinear responses of the coupled metallic quantum well, including, for example, the shorter wavelength reflected second order harmonic waves $R_{SHG}$ and/or transmitted second order harmonic waves $T_{SHG}$, by at least providing additional surface plasmon resonance.

Figure 4D:
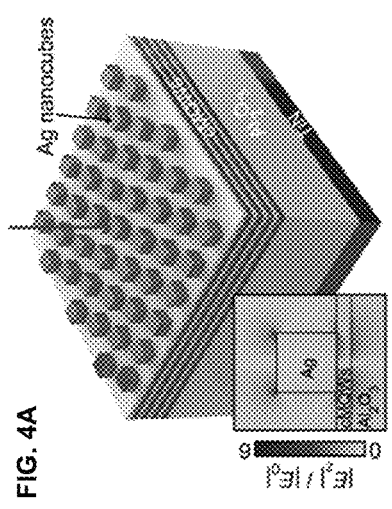
FIG. 4D depicts the generation of second order nonlinear responses by a coupled metallic quantum well having a plasmon nanostructure metasurface, in accordance with some example embodiments.
Figure 4C:
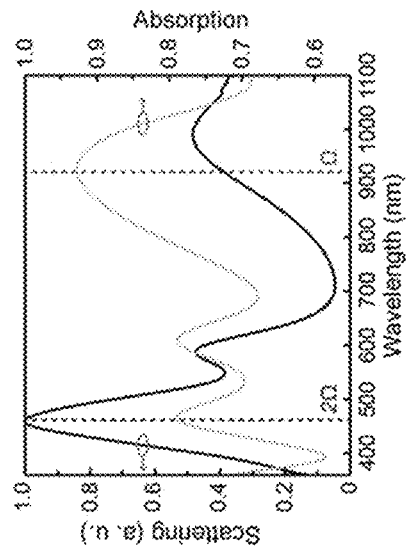
FIG. 4C depicts the generation of second order nonlinear responses by a coupled metallic quantum well having a plasmon nanostructure metasurface, in accordance with some example embodiments.

FIG. 4C depicts the emission spectra and the absorption spectra of the coupled metallic quantum well. The resonant peak centered at the double transition frequency $\Omega$ in the absorption spectrum of the coupled metallic quantum well may indicate an enhancement to the absorption of incident light $I_\Omega$ at the desired frequency. Meanwhile, the dominant resonant peak centered at the frequency of the second order nonlinear response (e.g., $2\Omega$) in the emission spectrum may indicate an enhancement of the nonlinear responses generated by the coupled metallic quantum well.

FIG. 4D depicts the corresponding power efficiency $P_{SHG}/P_{FF}$, wherein $P_{SHG}$ ($P_{FF}$) correspond to the total average power at the wavelength of the second order nonlinear response. The power efficiency $P_{SHG}/P_{FF}$ associated with the coupled metallic quantum well having the metasurface may reach $10^{-4}$, which is more than 4 orders higher than the power efficiency of conventional quantum wells.

In some example embodiments, a metallic quantum well (e.g., the metallic quantum well 100) and a coupled metallic quantum well (e.g., the coupled metallic quantum well 200) may be formed using a variety of fabrication techniques including, for example, epitaxial growth and/or the like. The well material forming the metallic quantum well and/or the coupled metallic quantum well may include a metal and/or a metal compound such as, for example, a transition metal, a transition metal nitride, and/or the like. Meanwhile, the barrier material forming the metallic quantum well and/or the coupled metallic quantum well may include a dielectric. Accordingly, the metallic quantum well and/or the coupled metallic quantum well may be fabricated by growing the well material and/or the barrier material epitaxially, for example, by a Magnetron Sputtering technique on a substrate.

For example, a metallic quantum well and/or a coupled metallic quantum well having titanium nitride (TiN) wells and aluminum oxide ($Al_2O_3$) barriers may be formed by growing the titanium nitride (TiN) and the aluminum oxide ($Al_2O_3$) epitaxially on sapphire substrates. The temperature for the epitaxial growth of the titanium nitride (TiN) may be set to 350° C. while being exposed to a combination of seven parts nitrogen gas ($N_2$) to three parts argon gas (Ar).

As noted, the nonlinear responses of a material to light may be exploited for a variety of applications including, for example, metrology, communications, and/or the like. For example, the second order nonlinear response in which two photons of light are absorbed to generate a single photon of light having twice the frequency may be used to change the color of an incident light beam. Alternatively and/or additionally, the third order nonlinear response in which three photons of light are absorbed to generate a single photon of light having thrice the frequency may be used to generate multicolored light spanning a wide and continuous optical spectrum (e.g., a super-continuum) from a narrow band, monochromatic incident light beam.

Quantum wells and/or coupled quantum wells formed from conventional materials may not exhibit sufficient non-linearity at the miniature scale (e.g., nanoscale) required for on-chip applications. By contrast, the nonlinear responses exhibited by a metallic quantum well (e.g., the metallic quantum well 100) and/or a coupled metallic quantum well (e.g., the couple metallic quantum well 200) may be orders of magnitude greater than the nonlinear responses exhibited by quantum wells and/or coupled quantum wells formed from conventional materials. Accordingly, a metallic quantum well and/or a coupled metallic quantum well may exhibit sufficient nonlinearity even at a miniature scale. Metallic quantum wells and/or coupled metallic quantum wells may therefore be deployed for a variety of on-chip applications including, for example, on-chip pulse limiter, on-chip super-continuum generator, and/or the like.

Figure 5:
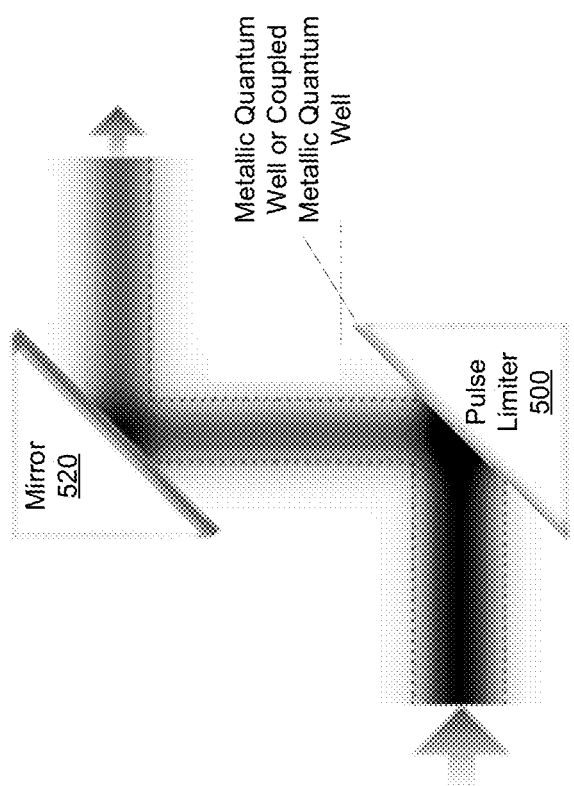
FIG. 5 depicts an example of a pulse limiter implemented using a metallic quantum well and/or a coupled metallic quantum well, in accordance with some example embodiments.

FIG. 5 depicts an example of a pulse limiter 500 implemented using a metallic quantum well and/or a coupled metallic quantum well, in accordance with some example embodiments. Referring to FIGS. 1-2 and 5, the pulse limiter 500 may be implemented using a metallic quantum well (e.g., the metallic quantum well 100) and/or a coupled metallic quantum well (e.g., the coupled metallic quantum well 200). The pulse limiter 500 including the metallic quantum well and/or the coupled metallic quantum well may be configured to provides a linear transmission and/or reflection of an incident light beam if the intensity and/or power of that incident light beam is below a threshold value. By contrast, the pulse limiter 500 may be configured to attenuate the intensity and/or power of the incident light beam such that the intensity and/or the power of the incident light beam remains below the threshold value.

As shown in FIG. 5, the incident light may be reflected off the pulse limiter 500. The reflected light beam, whose intensity and/or power may not exceed a threshold value, may be further reflected, for example, by a mirror 520, to a desired output and/or destination.

In some example embodiments, the pulse limiter 500 may operate in a reflection mode due to the optical properties of the metallic quantum well and/or the coupled metallic quantum well used to implement the pulse limiter 500. Increasing the intensity and/or the power of the incident light beam may trigger a Kerr effect that alters the refractive index of the metallic quantum well and/or the couple metallic quantum well. In this case, a high intensity and/or high power incident light beam may diminish the refractive index of the metallic quantum well and/or the coupled metallic quantum well, thereby altering the reflective properties of the metallic quantum well and/or the coupled metallic quantum well.

For example, the metallic quantum well and/or the coupled metallic quantum well may be highly reflective when exposed to a low intensity and/or low power incident light beam. As such, the low intensity and/or low power incident light beam may be linearly reflected by the metallic quantum well and/or the coupled metallic quantum well, for example, to the mirror 520, without any attenuation in intensity and/or power. By contrast, the metallic quantum well and/or the coupled metallic quantum well exhibit nonlinearity (e.g., third order nonlinearity) and become dielectric when exposed to a high intensity and/or high power incident light beam. That is, the metallic quantum well and/or the coupled metallic quantum well may become less reflective when exposed to a high intensity and/or high power incident light beam. Accordingly, portions of the high intensity and/or high power incident light beam may remain unreflected while the intensity and/or power of light beam that is reflected, for example, to the mirror 250, may not exceed the threshold value.

Figure 6:
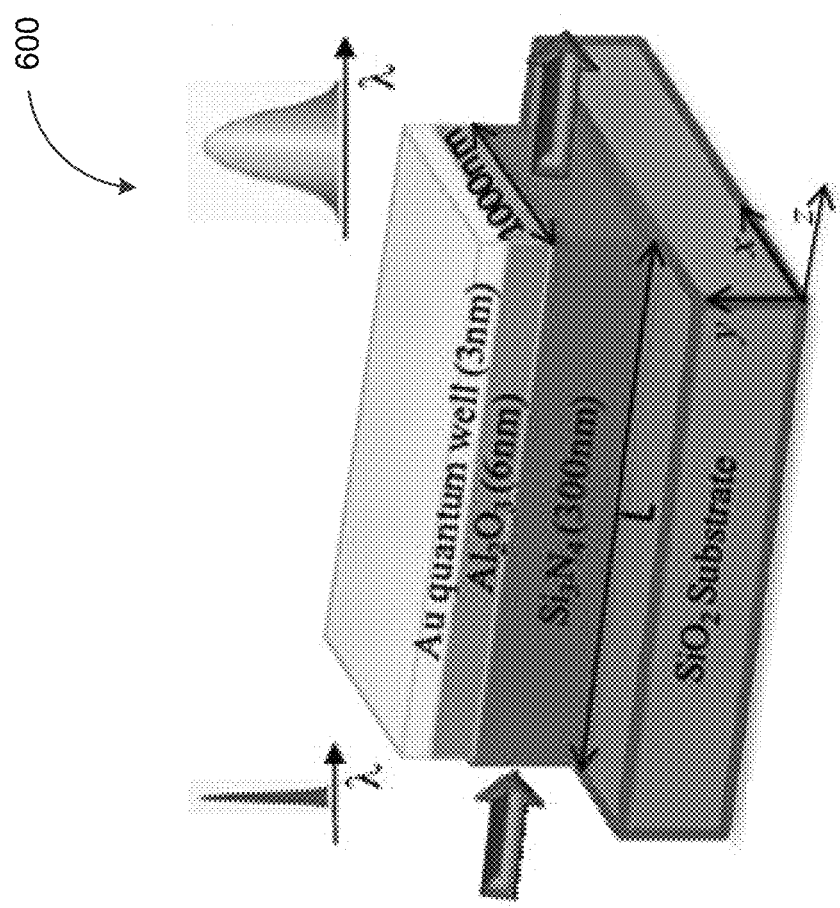
FIG. 6 depicts an example of a super-continuum generator implemented using a metallic quantum well and/or a coupled metallic quantum well, in accordance with some example embodiments.

FIG. 6 depicts an example of a super-continuum generator 600 implemented using a metallic quantum well and/or a coupled metallic quantum well, in accordance with some example embodiments. Referring to FIGS. 1-2 and 6, the super-continuum generator 600 may be implemented using a metallic quantum well (e.g., the metallic quantum well 100) and/or a coupled metallic quantum well (e.g., the coupled metallic quantum well 200). The super-continuum generator 600 including the metallic quantum well and/or the coupled metallic quantum well may be configured to broaden the narrow spectral band of a monochromatic incident light beam such as, for example, pulses of laser and/or the like. In doing so, the super-continuum generator 600 may produce a multicolored light spanning a wide and continuous spectrum.

As shown in FIG. 6, the super-continuum generator 600 may include a metallic quantum well formed by disposing a layer of well material (e.g., 3 nanometer thick layer of gold (Au)) on top of a layer of barrier material (e.g., 6 nanometer thick layer of aluminum oxide ($Al_2O_3$). The metallic quantum well may be further disposed on top of a waveguide (e.g., 300 nanometer thick layer of silicon nitride ($Si_3O_4$)) before being placed atop a substrate (e.g., a silicon dioxide ($SiO_2$) substrate). However, it should be appreciated that the super-continuum generator 600 may also be formed from a coupled metallic quantum well that combines two or more metallic quantum wells.

In some example embodiments, the super-continuum generator 600 may generate a super-continuum due to the nonlinearity exhibited by the metallic quantum well and/or the coupled metallic quantum well. For example, the metallic quantum well and/or the coupled metallic quantum well may exhibit third order nonlinearity. The super-continuum that is generated by the super-continuum generator 600 may be part of the third-order nonlinear responses of the metallic quantum well and/or the coupled metallic quantum well. Due to the large magnitude of the third-order linear responses exhibited by the metallic quantum well and/or the coupled metallic quantum well, the super-continuum generator 600 may be capable of achieving a wide optical spectrum over a significantly shorter propagation distance than conventional mechanisms such as, for example, optical fibers.

Figure 7:
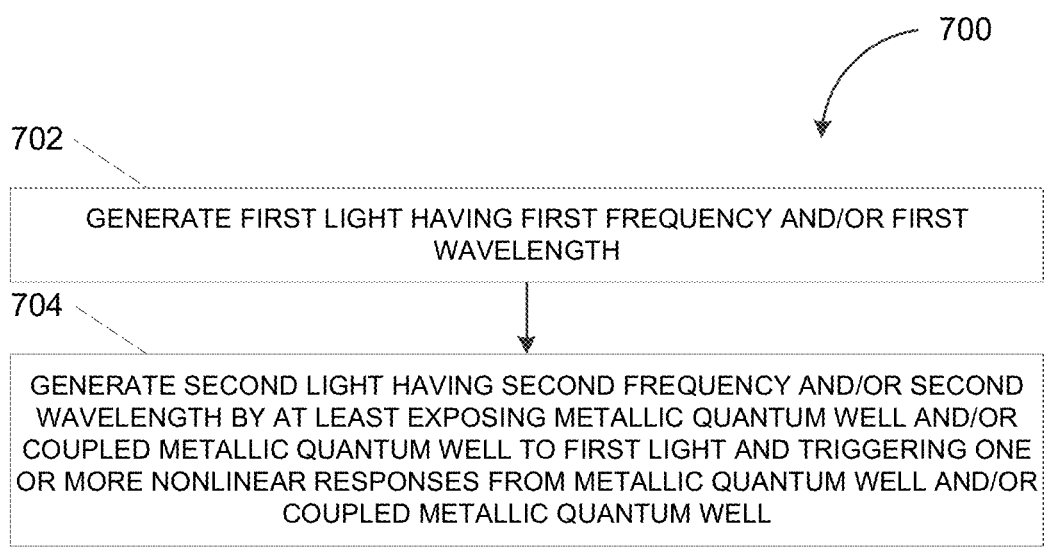
FIG. 7 depicts a flowchart illustrating a process for generating a nonlinear response, in accordance with some example embodiments.

FIG. 7 depicts a flowchart illustrating a process 700 for generating a nonlinear response, in accordance with some example embodiments. Referring to FIGS. 1-2, 3A-C, 4A-D, and 7, the process 700 may be performed in order to generate a second order nonlinear response that doubles the frequency and/or halves the wavelength of an incident light beam. Alternatively and/or additionally, the process 700 may be performed in order to generate a third order nonlinear response in which refracted light beam and/or transmitted light beam have thrice the frequency and/or one-third the wavelength of the incident light beam.

At 702, a first light having a first frequency and/or a first wavelength may be generated. For example, the first light may be generated to have a first frequency that corresponds to a transition frequency of a metallic quantum well (e.g., the metallic quantum well 100) and/or a coupled metallic quantum well (e.g., the coupled metallic quantum well 200). As noted, the charge carriers (e.g., electrons and holes) occupying the metallic quantum well and/or the coupled metallic quantum well may be confined to the minimized dimensions of the metallic quantum well and/or the coupled metallic quantum well, thereby forcing these charge carriers to transition between discrete energy states. The absorption spectra of the metallic quantum well and/or the coupled metallic quantum well may correspond to these discrete energy states. Accordingly, the metallic quantum well and/or the coupled metallic quantum well may be configured to absorb photons of light having a certain frequency and/or wavelength.

At 704, a second light having a second frequency and/or a second wavelength may be generated by at least exposing a metallic quantum well and/or a coupled metallic quantum well to the first light and triggering one or more nonlinear responses from the metallic quantum well and/or the coupled metallic quantum well. In some example embodiments, exposing a metallic quantum well (e.g., the metallic quantum well 100) and/or a coupled metallic quantum well (e.g. the coupled metallic quantum well 200) to incident light within the absorption spectra may trigger a nonlinear response that includes, for example, a second order nonlinear response, third order nonlinear response, and/or the like. As noted, a second order nonlinear response may include a doubling of the frequency and/or a halving of the wavelength of the incident light. Alternatively and/or additionally, a third order nonlinear response may include a tripling of the frequency of the incident light such that the light that is subsequently refracted and/or transmitted through the metallic quantum well and/or the coupled metallic quantum well has one third the wavelength of the incident light.

The nonlinear responses of the metallic quantum well and/or the coupled metallic quantum well may be exploited for a variety of applications. In particular, the metallic quantum well and/or the coupled metallic quantum well may exhibit nonlinear responses that are orders of magnitude larger than the nonlinear responses exhibited by a quantum well formed from conventional well materials such as semiconductors. Thus, while a quantum well formed from conventional well materials may not exhibit sufficient nonlinearity at a miniaturized scale, a metallic quantum well and/or a coupled metallic quantum well may provide adequate nonlinear responses even when the dimensions of the metallic quantum well and/or the coupled metallic quantum well have been miniaturized, for example, to a nanoscale. For example, the metallic quantum well and/or the coupled metallic quantum well may be deployed for on-chip application including, for example, as part of an on-chip pulse limiter, an on-chip super-continuum generator, and/or the like The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
a first layer of metallic well material disposed between a first layer of barrier material and a second layer of barrier material, the metallic well material generating one or more nonlinear responses when exposed to a first light having a first frequency, and the one or more nonlinear responses includes a second light having a second frequency, wherein the first layer of metallic well material comprises a first metallic side and a second metallic side opposite the first metallic side, wherein the second layer of barrier material comprises a first barrier side and a second barrier side opposite the first barrier side, and wherein the first metallic side abuts the first layer of barrier material and the second metallic side abuts the first barrier side; and
a second layer of metallic well material disposed between the second layer of barrier material and a third layer of barrier material, wherein the second layer of metallic well material comprises a third metallic side and a fourth metallic side opposite the third metallic side, wherein the third metallic side abuts the second barrier side, and wherein the fourth metallic side abuts the third layer of barrier material;
wherein the first layer of metallic well material comprises a first metallic thickness;
wherein the second layer of metallic well material comprises a second metallic thickness;
wherein the first layer of barrier material comprises a first barrier thickness;
wherein the second layer of barrier material comprises a second barrier thickness;
wherein the third layer of barrier material comprises a third barrier thickness; and
wherein a total thickness of the first metallic thickness, the second metallic thickness, the first barrier thickness, the second barrier thickness, and the third barrier thickness is less than or equal to 10 nanometers.

2. The apparatus of claim 1, further comprising:
tuning an absorption spectrum and/or an emission spectrum of the apparatus by at least adjusting the first metallic thickness and the second metallic thickness.

3. The apparatus of claim 2, wherein the first metallic thickness and the second metallic thickness are equal to or less than an exciton Bohr radius.

4. The apparatus of claim 1, further comprising:
tuning an absorption spectrum and/or an emission spectrum of the apparatus by at least selecting a first material comprising the first layer of metallic well material to be the same as or different from a second material comprising the second layer of metallic well material.

5. The apparatus of claim 1, wherein the metallic well material includes a metal and/or a metal compound.

6. The apparatus of claim 1, wherein the metallic well material comprises a noble metal and/or a transition metal nitride.

7. The apparatus of claim 1, wherein the barrier material is associated with a wider bandgap than the metallic well material.

8. The apparatus of claim 1, wherein the barrier material comprises a dielectric.

9. The apparatus of claim 1, wherein the one or more nonlinear responses include a second order nonlinear response or a third order nonlinear response.

10. The apparatus of claim 9, wherein the second frequency is twice or three times the first frequency.

11. The apparatus of claim 9, wherein the first light is associated with the first frequency and a second frequency, and wherein the second frequency comprises a sum of the first frequency and the second frequency.

12. The apparatus of claim 1, further comprising:
a metasurface that is formed by at least disposing, on top of a surface of the apparatus, one or more plasmon nanostructures.

13. The apparatus of claim 12, wherein the one or more plasmon nanostructures comprise one or more metallic structures.

14. The apparatus of claim 12, wherein the one or more plasmon nanostructures comprise an array of monocrystalline silver (Ag) cubes.

15. The apparatus of 1, wherein the metallic well material further generates one or more linear responses when exposed to the first light having the first frequency, and wherein the one or more linear responses include a third light having the first frequency.

16. A super-continuum generator, comprising:
a metallic quantum well formed by interposing a first layer of metallic well material between a first layer of barrier material and a second layer of the barrier material, wherein the first layer of metallic well material comprises a first metallic side and a second metallic side opposite the first metallic side, wherein the second layer of the barrier material comprises a first barrier side and a second barrier side opposite the first barrier side, and wherein the first metallic side abuts the first layer of barrier material and the second metallic side abuts the first barrier side, and
interposing a second layer of metallic well material between the second layer of the barrier material and a third layer of the barrier material, wherein the second layer of metallic well material comprises a third metallic side and a fourth metallic side opposite the third metallic side, wherein the third metallic side abuts the second barrier side, and wherein the fourth metallic side abuts the third layer of the barrier material, the metallic quantum well generating a nonlinear response when exposed to a first light, the first light being monochromatic, and the nonlinear response including a broadband of frequencies forming a super-continuum;
wherein the first layer of metallic well material comprises a first metallic thickness;
wherein the second layer of metallic well material comprises a second metallic thickness;
wherein the first layer of barrier material comprises a first barrier thickness;
wherein the second layer of barrier material comprises a second barrier thickness;
wherein the third layer of barrier material comprises a third barrier thickness; and
wherein a total thickness of the first metallic thickness, the second metallic thickness, the first barrier thickness, the second barrier thickness, and the third barrier thickness is less than or equal to 10 nanometers.

17. The apparatus of claim 1, wherein the first layer of barrier material, the first layer of metallic well material, the second layer of barrier material, the second layer of metallic well material, and the third layer of barrier material are parallel with respect to one another.

18. The apparatus of claim 1, wherein the second metallic thickness is different from the first metallic thickness.

19. The apparatus of claim 1, wherein the first barrier thickness and the third barrier thickness are equal; wherein the second barrier thickness is less than the first barrier thickness and the third barrier thickness; and wherein the second barrier thickness is 0.5 nanometers.

20. A coupled metallic quantum well, comprising:
a first layer of metallic well material disposed between a first layer of barrier material and a second layer of barrier material, the metallic well material generating one or more nonlinear responses when exposed to a first light having a first frequency, and the one or more nonlinear responses includes a second light having a second frequency, wherein the first layer of metallic well material comprises a first metallic side and a second metallic side opposite the first metallic side, wherein the second layer of barrier material comprises a first barrier side and a second barrier side opposite the first barrier side, and wherein the first metallic side abuts the first layer of barrier material and the second metallic side abuts the first barrier side; and
a second layer of metallic well material abutting the second barrier side;
wherein the first layer of metallic well material comprises a first metallic thickness;
wherein the second layer of metallic well material comprises a second metallic thickness;
wherein the first layer of barrier material comprises a first barrier thickness;
wherein the second layer of barrier material comprises a second barrier thickness; and
wherein a total thickness of the first metallic thickness, the second metallic thickness, the first barrier thickness, and the second barrier thickness is less than or equal to 10 nanometers.

* * * * *